(No Model.)

F. J. H. HAZARD.
PNEUMATIC CASH CARRIER.

No. 566,575. Patented Aug. 25, 1896.

Witnesses
Fred Clarke
J. W. Neff

Inventor
F. J. H. Hazard
by
Ridout & Maybee
Att'ys

UNITED STATES PATENT OFFICE.

FREDERICK J. H. HAZARD, OF TORONTO, CANADA.

PNEUMATIC CASH-CARRIER.

SPECIFICATION forming part of Letters Patent No. 566,575, dated August 25, 1896.

Application filed March 25, 1895. Serial No. 543,086. (No model.)

*To all whom it may concern:*

Be it known that I, FREDERICK JAMES HAWORTH HAZARD, of the city of Toronto, in the county of York and Province of Ontario, Canada, have invented certain new and useful Improvements in Cash-Carriers, of which the following is a specification.

The object of my invention is to devise a simple and effective cash-carrier apparatus on the vacuum principle, through which no air passes when the apparatus is not in use; and my invention consists, essentially, of mechanism arranged to automatically open the apparatus for the passage of air with the introduction of the first carrier at the salesman's end, and to automatically close it when the last carrier has been returned and passed out at the same end of the apparatus, the whole being arranged in detail substantially as hereinafter more specifically described and then definitely claimed.

Figures 1, 2:
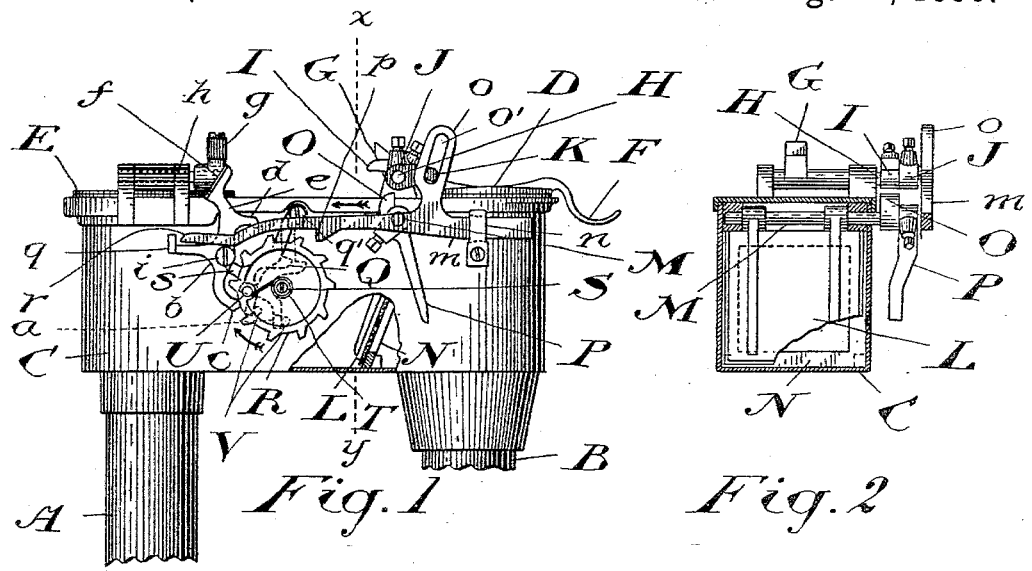
Figure 3:
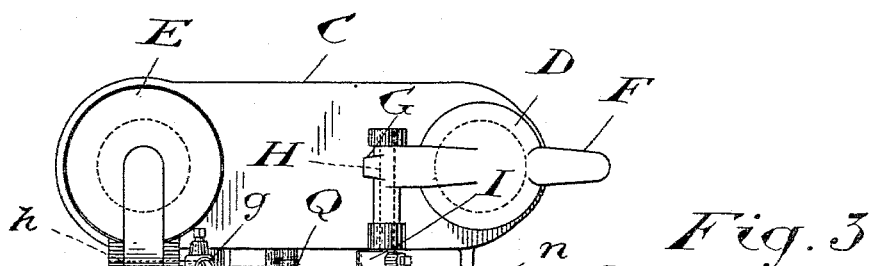
Figure 4:
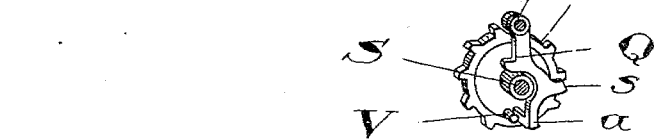

In the accompanying drawings, Figure 1 is a view in elevation of the salesman's end of the apparatus. Fig. 2 is a cross-section through the line *a b* in Fig. 1. Fig. 3 is a plan view of the salesman's end of the apparatus. Fig. 4 is a perspective detail of the ratchet-wheel and catch at the salesman's end of the apparatus.

In the drawings like letters of reference indicate corresponding parts in the different figures.

In Figs. 1, 2, and 3, A is the up-tube, and B the down-tube, of the apparatus, which, in the general arrangement, is substantially similar to that shown in my United States Letters Patent No. 530,772, dated December 11, 1894. These tubes are connected at the salesman's end by the chamber C. D is the inlet-trap located opposite the end of the down-tube B, and E is the exit-trap located opposite the end of the up-tube A. The trap D has a handle F connected thereto, and also a stop G to limit the backward throw of the trap by coming in contact with the top of the chamber C. The trap D is hinged, as shown, to the top of the said chamber and is rigidly connected to the spindle H of the hinge.

I is a suitably-shaped cam rigidly connected by a set-screw, as shown, to the spindle H.

J is a crank-arm similarly connected to the spindle H, and provided with a wrist-pin K at its outer end.

L is a valve rigidly connected to a spindle M, journaled as shown. (See Fig. 2.) When closed, this valve fits against a suitably-constructed valve-seat N, so as to prevent the passage of air through the chamber C.

O is a cam rigidly connected by a set-screw, as shown, to the spindle M. This cam lies in the path of the cam I, so that when the inlet-trap B is opened the spindle M will be rocked and the valve L raised from its seat to permit of the passage of air through the up-tube A and the chamber C.

P is an arm rigidly connected by a set-screw, as shown, to the spindle M, so as to move therewith when the valve L is opening or closing.

Q is a catch pivoted, as shown at $q'$, to the side of the chamber C, and so shaped as to engage with and retain the arm P in a raised position when the inlet-trap is opened and the valve L thus raised from its seat. This catch is shown in detail in Fig. 4 and in dotted lines in Fig. 1.

R is a ratchet-wheel journaled on the spindle S, which is rigidly connected to the side of the chamber C. T is a spring wound round this spindle and rigidly connected at one end thereto, the other end being attached to the stud U on the face of the ratchet-wheel. This spring is so wound as to tend to revolve the ratchet-wheel R in the direction indicated by arrow. V is a stud formed on the other side of this ratchet-wheel and lying in the path of a projection on the finger *a*, forming a part of the pivoted catch Q. From this construction it follows that when the ratchet-wheel R is free to revolve in the direction of the arrow the stud V, coming in contact with the projection *a* on the catch Q, will release the arm P and allow the valve L to close.

*b* is a dog pivoted, as shown, on the spindle *i*, rigidly connected to the side of the chamber C. This dog is provided with two pallets *c* and *d*, arranged so that every time a rocking motion is given to the dog *b* one tooth of the ratchet-wheel R is allowed to escape in a manner similar to the escapement of an ordinary clock.

*e* is an arm on the dog *b*, having an inclined face *f* lying in the path of an arm *g*, the latter being provided with a friction-roller to reduce wear and rigidly connected, as indicated, to the spindle $h$ of the hinge of the exit-trap E. The method of hinging this trap is clearly shown in the drawings and need not be more particularly specified.

$j$ is a spring coiled on the hub of the dog $b$ (see Fig. 3) and so connected to the boss of the said spindle $i$ and the dog $b$ as to tend to keep the said dog in the position shown in Fig. 1. From this construction it follows that the reciprocating motion of the dog $b$, hereinbefore spoken of, is caused by the opening of the trap E, bringing the arm $g$ against the inclined face $f$ of the arm $e$ of the dog $b$, which rocks the said dog in one direction, while the return motion is given by the spring $j$ to the normal position shown in Fig. 1.

$m$ is a bar sliding in the guide $n$ and on the spindle $i$. $o$ is a projection on top of the said bar $m$, having a slot $o'$ formed therein, with which the wrist-pin K on the crank-arm J engages, as shown in Fig. 1. The slot in the projection $o$ is preferably inclined in a direction away from the ratchet-wheel R, thus preventing the wrist-pin K from pressing downward the end $r$ of the sliding bar $m$. As this end $r$ moves over the arm $q$ on the dog $b$ when the slide is operated, downward pressure of the end $r$ would tend to prevent the rocking of the dog $b$, and thus interfere with the free rotation of the ratchet-wheel R.

$p$ is a lug formed on the bar $m$, and so located as to engage with a tooth of the ratchet-wheel R when the slide is moved in the direction indicated by arrow, which occurs every time the inlet-trap D is opened through the medium of the crank-arm J and slotted projection $o$. Every such movement of the bar $m$ revolves the ratchet-wheel one tooth against the action of the spring T. The lug $p$ should be made of such a length that the rocking of the dog $b$, by the action of the ratchet-wheel R when the end $r$ of the sliding bar $m$ is over the arm $q$, will not lift the lug $p$ clear of the tooth of the ratchet-wheel R with which it is engaged, the sudden and more extensive movement of the dog $b$ by the action of the arm $g$ alone being sufficient to raise the dog $p$ clear of the teeth of the ratchet-wheel, as hereinafter described. From the construction described it follows that the ratchet-wheel R is revolved one tooth in the opposite direction to that indicated by the arrow every time the inlet-trap D is opened, and that it is permitted to revolve one tooth in the opposite direction by the action of the dog $b$ whenever the outlet-trap E is opened.

$q$ is an arm formed on the dog $b$ and so shaped as to lie in a position slightly below the path of the end $r$ of the bar $m$ when moved laterally to engage with a tooth of the ratchet-wheel R by the opening of the inlet-trap D. To illustrate the reason for this construction, let it be supposed that the inlet-trap D is being opened, so as to move the bar $m$ and bring the lug $p$ into contact with one tooth of the ratchet-wheel bar. This movement of the bar also brings the end $r$ of the bar over the arm $q$, formed on the dog $b$. If at this moment a carrier emerges from the exit-trap E, the dog $b$ will be rocked and will thus raise the bar $m$, so that the lug $p$ will be disengaged from the tooth of the ratchet-wheel R. By the rocking of the dog $b$ the ratchet-wheel R is allowed to revolve one tooth in the direction indicated by the arrow. As the opening of the trap E and rocking of the dog $b$ takes but an exceedingly small fraction of time the bar $m$ is quickly dropped to engage with the next tooth to that which it had previously been disengaged from and by its continued motion will force it back to its previous position, and the ratchet-wheel is locked by the dog $b$. Thus the simultaneous opening of the inlet and exit traps has left the ratchet-wheel R in the position which it previously occupied. It can readily be seen that if the lug $p$ on the bar $m$ were not thus disengaged from the tooth on the ratchet-wheel R with which it engages the wheel R will be revolved backward one tooth irrespective of the exit of the carrier emerging from the exit-trap, and the ratchet-wheel would thus apparently register one more carrier as being in the apparatus than would actually be the case.

$s$ is an arm formed on the pivoted catch Q to limit its motion by coming in contact with the spindle $i$, as indicated in Fig. 1. In this figure the catch Q is shown in dotted lines, both in position to retain the arm P and when disengaged therefrom. The operation of this portion of my device is substantially as follows: The first time the inlet-trap D is opened to place a carrier in the apparatus the air-valve L is opened and held open by the pivoted catch Q engaging with the arm P. At the same time the ratchet-wheel R is revolved one tooth in the direction contrary to that indicated by arrow. Every time a fresh carrier is placed in the apparatus the ratchet-wheel R is revolved another tooth. It should be mentioned that before the introduction of the carrier in the apparatus the stud V and the catch Q are in the position shown to the left hand in Fig. 1, the introduction of the first carrier into the system bringing them into the right-hand position shown. Supposing three carriers to have been introduced into the apparatus, the ratchet-wheel R will be revolved three teeth in a direction contrary to that indicated by arrow, and when these carriers are returned through the up-tube A the passage of each one through the exit-trap E allows the ratchet-wheel R to revolve one tooth in the direction indicated by arrow, so that with the exit of the last carrier the stud U comes in contact with the projection on the finger $a$ of the catch Q and releases the arm P, thus closing the valve L and shutting off the current of air till the apparatus is again in use. It will be seen that the ratchet-wheel R thus serves as a registering device and always indicates the difference between the number of carriers sent down through the apparatus and those emerging again at the salesman's end. It also controls the closing of the air-valve, as described.

The proportions shown in the drawings will permit of the introduction of nine carriers and their return through the apparatus without shutting off the air supply.

As already described, the simultaneous introduction and exit of a carrier leaves the ratchet-wheel R in the position it previously occupied. The cutting off of the air supply when the apparatus is not in use involves a great saving in power, as it permits of the use of a storage-tank in which a substantially constant pressure is maintained by an intermittently-working pump, which may be arranged to maintain the requisite vacuum, either automatically or otherwise.

When I refer to means for indicating on the device the entrance of carriers into the apparatus, I intend, primarily, to cover any device which indicates to itself the entrance or exit of the carriers. Of course, if it is desired that the device also indicate the number of carriers in the tube to the operator, this could easily be told by any index-mark which might be placed on the ratchet-wheel R, and, in fact, the pin U (shown clearly in Fig. 1) might be used for such purposes, and I intend my claims to cover any and all of such devices.

What I claim as my invention is—

1. In a pneumatic cash-carrier apparatus, up and down tubes suitably connected and provided with inlet and exit traps, in combination with a valve suitably located to control the air supply; means for automatically opening and holding open the said valve when a carrier is introduced into the apparatus at the salesman's end, and means for automatically closing the valve when it is returned and passes out again at the same end, substantially as and for the purpose specified.

2. In a pneumatic cash-carrier apparatus, a chamber connecting the up and down tubes of the apparatus, and provided with the usual inlet and exit traps, in combination with an air-valve located within the said chamber; means for automatically opening and holding open the said valve when the first carrier of a series is introduced into the apparatus at the salesman's end, and means for automatically closing the valve when the last carrier of the series is returned and passes out again at the same end, substantially as and for the purpose specified.

3. In a pneumatic cash-carrier apparatus, a chamber connecting the up and down tubes, and provided with the usual inlet and exit traps in combination with an air-valve located within the said chamber; means for opening and holding open the said air-valve when the first carrier of a series is introduced into the apparatus, means controlling the closing of the air-valve, said means arranged to indicate the entrance of each carrier into the apparatus and the exit of each carrier from the same end of the apparatus so that at the exit of the last carrier of the series from the apparatus, the air-valve-controlling device allows the said air-valve to close, substantially as and for the purpose specified.

4. In a pneumatic cash-carrier apparatus, a chamber connecting the up and down tubes and provided with the usual inlet and exit traps, in combination with an air-valve located within the said chamber; means for opening and holding open the said air-valve when the first carrier of a series is introduced into the apparatus, means controlling the closing of the air-valve, said means being arranged to indicate the entrance of each carrier into the apparatus and the exit of each carrier from the same end of the apparatus so that at the exit of the last carrier of the series from the apparatus, the air-valve-controlling device allows the said air-valve to close and means whereby the simultaneous entrance of one carrier into the apparatus and the exit of another will leave the air-valve-controlling device unaffected, substantially as and for the purpose specified.

5. In a pneumatic cash-carrier apparatus, a valve controlling the air supply and an inlet-trap adapted to open the said valve when raised to admit the first carrier of a series in combination with an arm connected to the spindle of the said air-valve, a catch with which the said arm engages when the air-valve is open; an exit-trap; and means whereby the passage of the last carrier of the series from the same end of the apparatus will release the said catch and allow the valve to close, substantially as and for the purpose specified.

6. In a pneumatic cash-carrier apparatus, a valve controlling the air supply and an inlet-trap adapted, when raised to admit the first carrier of a series, to open the said valve, in combination with an arm connected to the spindle of the said air-valve; a catch with which the said arm engages when the valve is open; a ratchet-wheel adapted to release the said catch; a spring adapted to revolve the said ratchet-wheel; a slide operated by the inlet-trap and adapted to revolve the ratchet-wheel one tooth whenever the trap is opened to admit a carrier, and a dog engaging with the teeth of the ratchet-wheel, and adapted to release one tooth whenever the exit-trap is opened, substantially as and for the purpose specified.

7. In a pneumatic cash-carrier apparatus, a valve controlling the air supply and an inlet-trap adapted, when raised to admit the first carrier of a series, to open the said valve, in combination with an arm connected to the spindle of the said air-valve; a catch with which the said arm engages when the valve is open; a ratchet-wheel adapted to release the said catch; a spring adapted to revolve the said ratchet-wheel; a slide operated by the inlet-trap and adapted to revolve the ratchet-wheel one tooth whenever the trap is opened to admit a carrier, and a dog engaging with the teeth of the ratchet-wheel and adapted to release one tooth whenever the exit-trap is opened, and an arm upon the dog to raise the said slide to a non-operative position when both the inlet and the outlet traps are raised simultaneously, substantially as and for the purpose specified.

8. In a pneumatic cash-carrier apparatus, the combination of the valve L, controlling the air supply; the hinged inlet-trap D, adapted to open the valve L; the slide $m$; a lug $p$, formed thereon; means whereby a reciprocating motion is given to the said slide by the opening and closing of the inlet-trap D; the arm P, connected to the spindle M, of the valve L; ratchet-wheel R; the pivoted catch Q; stud V; the finger $a$ on the said catch lying in the path of the stud V, the ratchet-wheel R, pivoted on the spindle S; the spring T, adapted to revolve the said ratchet-wheel; the dog $b$, pivoted on the spindle $i$ and engaging with the teeth of the ratchet-wheel R; the spring $j$; the arm $e$ formed on the dog $b$, and means whereby the said arm $e$ is rocked when the exit-trap E, is opened, substantially as and for the purpose specified.

9. In a pneumatic cash-carrier apparatus, the combination of the valve L, controlling the air supply; the hinged inlet-trap D, adapted to open the valve L; the slide $m$; a lug $p$ formed thereon; means whereby a reciprocating motion is given to the said slide by the opening and closing of the inlet-trap D; the arm P, connected to the spindle M, of the valve L; ratchet-wheel R; the pivoted catch Q; stud V; the finger $a$ on the said catch lying in the path of the stud V; the ratchet-wheel R, pivoted on the spindle S; the spring T, adapted to revolve the said ratchet-wheel; the dog $b$, pivoted on the spindle $i$ and engaging with the teeth of the ratchet-wheel R; the spring $j$; bent arm $q$ formed on the dog $b$ and shaped to lie in the path of and a little below the end $r$, of the slide $m$, substantially as and for the purpose specified.

10. In a pneumatic cash-carrier apparatus, the combination of the valve L, controlling the air supply; the hinged inlet-trap D, adapted to open the valve L; the slide $m$; a lug $p$, formed thereon; means whereby a reciprocating motion is given to the said slide by the opening and closing of the inlet-trap D; the arm P, connected to the spindle M, of the valve L; the pivoted catch Q; the finger $a$ and arm $s$ formed thereon; the ratchet-wheel R; spindle S; spring T; stud V; dog $b$; arm $e$, and pallets $d$, and $c$ formed thereon; spindle $i$; spring $j$, and means whereby the said arm $e$ is rocked when the exit-trap E, is opened, substantially as and for the purpose specified.

11. In a pneumatic cash-carrier apparatus, the combination of the valve L, controlling the air supply; the hinged inlet-trap D, adapted to open the valve L; the slide $m$; a lug $p$, formed thereon; means whereby a reciprocating motion is given to the said slide by the opening and closing of the inlet-trap D; the arm P, connected to the spindle M, of the valve L; the pivoted catch Q; the finger $a$ and arm $s$ formed thereon; the ratchet-wheel R; spindle S; spring T; stud V; dog $b$; arms $c$, and $q$ and pallets $d$ and $c$, formed thereon; spindle $i$; spring $j$; end $r$ on the bar $m$, and means whereby the said arm $e$, is rocked when the exit-trap E, is opened, substantially as and for the purpose specified.

12. In an apparatus of the class described, mechanism for opening the air-valve L, and operating the ratchet-wheel R, comprising the following elements: air-valve L, ratchet-wheel R, the hinged inlet-trap D, provided with a handle F; the hinge-spindle H; the cam I; the crank-arm J; the wrist-pin K; spindle M, of the air-valve L; the cam O; the suitably-supported sliding bar $m$, the slotted projection $o$ and the lug $p$, formed on bar $m$ the latter being adapted to engage with the teeth of the ratchet-wheel R, substantially as and for the purpose specified.

13. In an apparatus of the class described, mechanism for releasing the ratchet-wheel R one tooth at a time, comprising the following elements: air-valve L, ratchet-wheel R, the hinged exit-trap E; the hinge-spindle $h$; arm $g$; pivoted dog $b$; pallets $c$, $d$ and arm $e$; inclined face $f$ on the arm $e$; ratchet-wheel R; spindle S; spring T; and spring $j$, substantially as and for the purpose specified.

14. In a pneumatic cash-carrier apparatus, the combination of inlet and outlet traps, an air-valve, and means for automatically opening said air-valve when the inlet-trap is opened and for closing said valve by the operation of the outlet-trap, substantially as described.

15. The combination in a vacuum pneumatic cash-carrier apparatus, of inlet and outlet traps, a valve normally tending to maintain said vacuum, and means for automatically opening said valve when said inlet-trap is opened and for closing said valve by the operation of the outlet-trap, substantially as described.

Toronto, March 18, 1895.

FREDERICK J. H. HAZARD.

In presence of—
A. M. NEFF,
FRED CLARKE.